Figure 1:
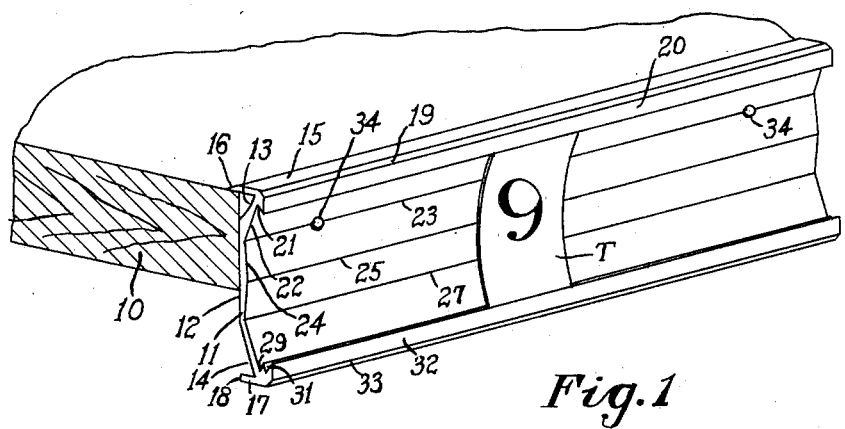

Nov. 22, 1949  G. L. GRAFF ET AL  2,489,089

PRICE TAG MOLDING

Filed April 11, 1947

INVENTORS
Glen L. Graff and
Joseph J. Robinson Jr.
BY
*Freese and Bishop*
ATTORNEYS.

Patented Nov. 22, 1949

2,489,089

UNITED STATES PATENT OFFICE 2,489,089

PRICE TAG MOLDING

Glen L. Graff, New Philadelphia, and Joseph J. Robinson, Jr., Dover, Ohio, assignors to Marsh Wall Products, Inc., Dover, Ohio, a corporation of Ohio Application April 11, 1947, Serial No. 740,850

6 Claims. (Cl. 40—16)

The invention relates to molding adapted to be attached to the edge of a shelf in a grocery store, market or the like, upon which goods are displayed, and adapted to removably hold price tags or tickets designating the price of the goods displayed upon the shelf as well as providing an ornamental appearance to the shelves.

Moldings for this general purpose have been in use for some time, but there are certain objections to such moldings, one of the greatest difficulties being that they do not hold the price tags firmly in place. This causes considerable trouble and annoyance to merchants as price tags may be either accidentally or intentionally slidably moved from one position on the molding to another so as to erroneously indicate a lower price for a higher priced article. Great confusion is frequently caused by children removing or changing the positions of all or a great number of the price tags. The reflection of light from such moldings as are now in use also causes annoyance to customers and makes it difficult for them to read the price tags.

The present invention therefore contemplates the provision of a price tag molding which will overcome the above mentioned objections and difficulties.

A further object is to provide a price tag molding which will firmly hold price tags in position thereon and prevent the tags from being slidably moved upon the molding, or from being easily removed therefrom.

A still further object is to provide a price tag molding the front face of which is formed in a plurality of planes at different angles so as to break up or kill the reflection of light from the molding.

It is also an object of the invention to provide a price tag molding which may be extruded from light metal, such as aluminum, or other suitable material.

Another object is to provide such a molding in which slightly oversize price tags may be quickly and easily accommodated and will be held easily in position.

A further object is to provide a price tag molding so constructed that it will accommodate price tags which are not accurately cut to size, holding a slightly undersize price tag tightly in place without permitting it to slide in the molding and allowing space for slightly oversize price tags to bend backward against the molding eliminating a forward bulge in the price tag which might cause it to fall out of the molding.

A still further object of the invention is to provide a price tag molding of the character referred to having a lip at its upper edge adapted to extend back over the top edge of the shelf.

Another object is to provide such a price tag molding constructed so that it may be reversed in position whereby the molding will be attached flush with the top of the shelf.

Still another object of the invention is to provide a molding of this character which may be quickly and easily attached to the edge of the shelf by means of metal clips which frictionally engage the inner surface of the molding.

A further object is to provide a price tag molding in which a special clip is provided for holding the molding upon a lower shelf tilted upward at an angle so that the price tags thereon may be more easily read by a customer standing close to the shelf and looking down.

Figure 2:
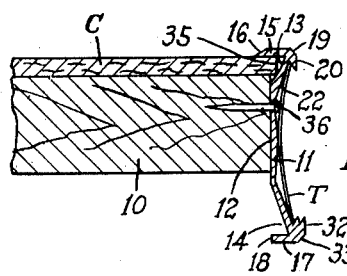
Figure 3:
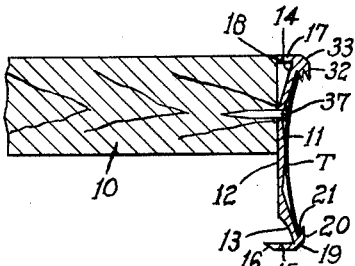
Figure 4:
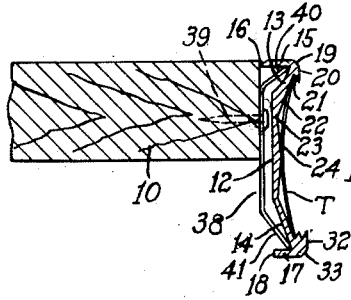
Figure 5:
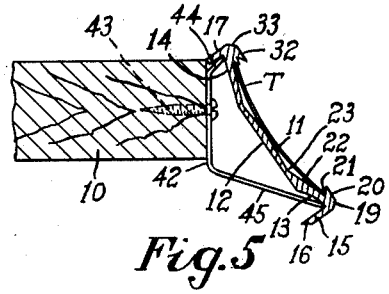
Figures 6, 7:
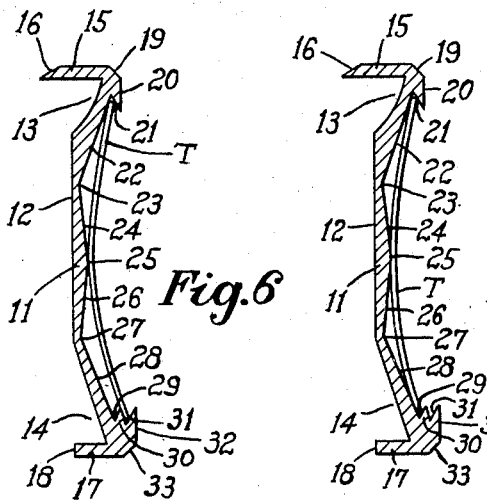

The above objects together with others which will be apparent from the drawing and following description, or which may be later referred to, may be attained by constructing the improved price tag molding in the manner hereinafter described in detail and illustrated in the accompanying drawing, in which;

Figure 1 is a perspective view of a portion of a shelf showing the improved price tag molding connected directly to the edge of the shelf by nails or the like with the lip at the upper edge of the molding extending backward over the top surface of the shelf;

Fig. 2 a transverse sectional view through a portion of a shelf having a covering thereon, showing the price tag molding attached to the edge of the shelf with the lip at the top edge of the molding extending over the edge of the shelf covering;

Fig. 3 a transverse sectional view through a portion of a shelf showing the molding in inverted position and attached flush with the top of the shelf;

Fig. 4 a transverse sectional view of a portion of a shelf showing the manner in which the molding may be attached to the shelf by means of metal clips;

Fig. 5 a similar view showing a special clip for attaching the molding to the shelf in position so that the molding is tilted upward;

Fig. 6 an enlarged, transverse sectional view through the improved price tag molding showing a price tag positioned in the outer slot or groove of the molding; and, Fig. 7 a similar view showing the manner in which the undersized price tag may be positioned in the inner slot or groove of the molding.

A shelf of any usual and well known construction, such as the ordinary wooden shelf commonly used in grocery stores and the like, is indicated at 10. The tag molding to which the invention pertains is adapted to be fastened to the front edge of such a shelf and is indicated generally at 11.

This molding may be formed of any suitable material but is preferably extruded from aluminum or similar material as this provides a uniform cross section throughout the length of the molding and provides a pleasing decorative finish for the edge of the shelf.

As best shown in Figs. 6 and 7 this molding is relatively thin in cross section and of a width or height substantially greater than the thickness of the shelf. A flat rear surface 12 is provided throughout the median portion of the molding for contact with the front edge of the shelf when the molding is applied in the manners shown in Figs. 1, 2 and 3.

At opposite sides of this flat portion 12 the rear surface of the molding is cut away as indicated at 13 and 14. A rearwardly extending flange or lip 15 is formed at the edge of the molding adjacent to the cut away portion 13 and extends rearwardly beyond the normal plane of the intermediate flat surface 12 preferably terminating in the tapered or bevelled edge 16.

At the other edge of the molding, adjacent to the cut away portion 14, a rearwardly disposed flange or rib 17 is formed preferably terminating in the straight edge 18 which may be located substantially in the normal plane of the intermediate flat rear surface 12.

The front corner of the molding adjacent to the flange 15 is preferably bevelled as indicated at 19 and the straight, narrow front surface 20 is formed adjacent to said bevel, a tapered groove 21 being formed at the rear thereof.

From the groove 21 the front surface of the molding is inclined downwardly and rearwardly, as indicated at 22, to the point 23 and then downwardly and forwardly preferably at a slightly less angle as indicated at 24, to substantially the center of the molding, as indicated at 25, and then downwardly and rearwardly at substantially the same angle, as indicated at 26, to the point 27 and then downwardly and forwardly, as indicated at 28, preferably at a slightly greater angle, to the longitudinal groove 29 which is located near the opposite longitudinal edge of the molding to the groove 21.

As shown in the several views of the drawings, it will be seen that the surfaces indicated at 22, 24, 26 and 28 are each about one-fourth the width of the molding, between the grooves, these surfaces all being substantially equal in width and located at various angles.

By thus forming the front face of the molding in a plurality of planes, on various angles, the molding is made more workable, is beautified by having alternate highlights and shadows, and more important these variously angled planes kill the reflection of light upon the molding making it easier for a customer to read the price tags thereon.

It will also be evident that with this construction the high point 25 at the center of the front face of the molding forms a contact point for the rear side of the price tag or member T so as to hold the same under tension when the edges thereof are inserted into the upper and lower grooves of the molding.

An inwardly disposed, substantially V-shape rib 30 separates the rear groove 29 from the forward, slightly deeper groove 31 in front of which is formed the straight, narrow, longitudinal front surface 32 which may terminate downwardly at the bevelled surface 33 adjacent to the rearwardly disposed rib or flange 17.

The grooves 21, 29 and 31 are all preferably V-shape in cross section so as to provide for easily inserting the upper and lower edges of a flexible price tag therein as indicated at T in the drawings.

The price tags are preferably formed of Celluloid or plastic material and should be cut so as to have the upper and lower edges thereof fitted into the grooves 21 and 29. However these price tags are not always cut accurately and even though a tag is slightly undersize, one edge may be inserted into the groove 21 and the opposite edge into the rear, higher groove 29 as best shown in Fig. 7, in which case the flexible price tag will bow inwardly and lay against the central high point 25 of the molding as best shown in Fig. 7, the tag being held firmly under compression so that it can not be slidably moved in the molding.

Where the price tag is oversize one edge is inserted into the tapered outer groove 31 as shown in Fig. 6 and it will be seen that in the same manner it will lay against the high point 25 of the molding. If a tag is very much oversize it may bend back more or less in contact with portions of the flat surfaces 22, 24, 26 and 28.

As shown in Figs. 6 and 7 the price tag will be spaced away from the front surface of the molding particularly at the reentrant angles 23 and 27, permitting a sharp instrument, such as a pointed knife blade or the like, to be inserted behind the price tag at one of these points in order to remove the same from the molding.

Even where a considerably oversize price tag is used with the adjacent edge inserted into the forward, deeper grooves 31, the price tag will not bulge forwardly away from the front surface of the molding in such manner that it might be easily displaced or slidably moved upon the molding, but will remain substantially in contact with the front surface of the molding and will be rigidly held in place.

As shown in Fig. 1 the molding may be attached to the front edge of the shelf 10, with the flange or rib 15 at the top of the molding engaged over the top edge of the shelf, the flat rear surface 12 of the molding laying flat against the front edge of the shelf, the molding being rigidly attached to the shelf in this position by means of nails, screws, screw nails or the like as indicated generally at 34 which may be driven through the reentrant angle 23 of the molding and into the shelf.

This provides a very satisfactory finish for the front top edge of the shelf, the lip or flange 15 forming a slight shoulder or abutment to prevent articles from being accidentally pushed forwardly off of the shelf while the bevelled rear edge 16 of this lip permits an article to be easily lifted forwardly off the shelf by a customer or clerk.

Where the top surface of the shelf is finished with any desired covering such as a painted or enameled surface, fibreboard, linoleum or the like as indicated at C in Fig. 2, this sheet of finishing material may extend slightly forward beyond the edge of the shelf as indicated at 35 in said figure. The molding may be positioned in the same manner as in Fig. 1 with the flat rear surface thereof against the front edge of the shelf 10 and the rearwardly disposed lip 15 being located over the top surface of the covering sheet C, the forward edge of which may be received in the rearward cut away portion 13 of the molding as shown. The molding may be secured to the shelf by nails or the like indicated at 36 in the same manner as shown in Fig. 1.

Where it is desired to have the top edge of the molding flush with the top surface of the shelf, the molding may be inverted, or reversed from the position shown in Fig. 2, and attached to the front edge of the shelf in the manner shown in Fig. 3 wherein the top of the rearwardly disposed rib or flange 17 is located flush with the top surface of the shelf, the flat rear surface 12 of the molding is located against the front edge of the shelf and the rear straight edge 18 of the rib 17 is located against the front edge of the shelf at the top thereof, the molding being secured to the shelf in this position by nails or the like indicated at 37.

If it is desired to attach the molding to the front edge of the shelf in such manner that the attaching nails, screws or the like are not visible, this may be accomplished by means of metal clips as indicated generally at 38 in Fig. 4.

These clips may be formed of sheet metal or the like and adapted to lay flat against the front edge of the shelf being attached thereto as by nails 39 or the like. The upper end of each clip is bent forwardly and upwardly as at 40 and the lower end thereof is bent forwardly and downwardly as at 41, the terminal ends thereof being adapted to snap into the cut away portions 13 and 14 respectively on the rear side of the molding. The clips are so positioned upon the front edge of the shelf that the top of the rearwardly disposed flange or rib 15 of the molding is flush with the top surface of the shelf as shown.

It is desirable to have the price tag molding on bottom or lower shelves tilted up so that the price tags thereon may be more easily read by a customer standing close to the shelves and looking down. In the past this has been accomplished by nailing, glueing or otherwise attaching a bevelled wood strip to the front edge of the shelf and attaching the price tag molding to this bevelled strip.

In Fig. 5 is shown the manner in which the present molding may be attached in upwardly tilted position to the front edge of a shelf without the necessity of using the conventional bevelled wood strip, and eliminating the labor and material required to apply the bevelled strip to the shelf.

In this case the metal clips 42 may be attached to the front edge of the shelf by screws, nails or the like as indicated at 43, the upper end of such clip being bent forwardly and upwardly as shown at 44. Substantially the lower half of the clip is bent forwardly and slightly downwardly as indicated at 45. The terminal ends of the upper and lower ends of the clip are adapted to be snapped into the cut away portions 13 and 14 upon the rear side of the molding.

In this connection the molding is preferably inverted as shown in Fig. 5 with the flange 17 at the top and the flange 15 at the bottom. This secures the molding upon the edge of the lower shelf in upwardly tilted position so that the price tags thereon may be easily read by a person standing close to the shelf.

From the above it will be apparent that a simple, inexpensive and efficient price tag molding is provided which may be quickly and easily attached to the front edge of a shelf in a variety of positions as may be desired or necessary and in which the price tags are securely held in the molding in position so that they can not be slidably moved therein or easily removed regardless of whether they are slightly undersize or oversize.

We claim:

1. A price tag molding adapted to be attached to the edge of a shelf and having longitudinal grooves near opposite edges of its front face for receiving the upper and lower edges of a price tag, the front surface of the molding being rearwardly inclined from each groove toward the center for substantially one-fourth of the width of the molding and then outwardly inclined to the center of the molding whereby the front face of the molding comprises four angular, equal surfaces, a flat rear surface adapted to contact the front edge of the shelf and a rearwardly extending flange at one edge for engaging over the top of the shelf.

2. A price tag molding adapted to be attached to the edge of a shelf and having a longitudinal groove near one edge of its front face and a pair of parallel, longitudinal grooves at the opposite edge, the outermost groove of said pair being slightly deeper than the innermost groove whereby price tags of various lengths may be accommodated in said grooves, the front surface of the molding being rearwardly inclined from each edge toward the center and then outwardly inclined to the center of the molding.

3. A price tag molding adapted to be attached to the edge of a shelf and having longitudinal grooves near opposite edges of its front face for receiving the upper and lower edges of a price tag, a rearwardly disposed flange at each edge of the molding, there being a cut-away portion on the rear of the molding adjacent to each flange, and a sheet metal clip having a flat intermediate portion for attachment to the edge of the shelf and having forwardly inclined upper and lower ends for snapping into the cut-away portions of the molding.

4. A price tag molding adapted to be attached to the edge of a shelf and having longitudinal grooves near opposite edges of its front face for receiving the upper and lower edges of a price tag, a rearwardly disposed flange at each edge of the molding, there being a cut-away portion on the rear of the molding adjacent to each flange, and a sheet metal clip having a flat intermediate portion for attachment to the edge of the shelf and having forwardly inclined upper and lower ends for snapping into the cut-away portions of the molding, the inclined lower end of the clip being of greater length than the upper end so as to hold the molding tilted upward.

5. A price tag molding adapted to be attached to the edge of a shelf and having longitudinal grooves near opposite edges of its front face for receiving the upper and lower edges of a price tag, the front surface of the molding being rearwardly inclined from each groove toward the center for substantially one-fourth of the width of the molding and then outwardly inclined to the center of the molding, said last named point being located in a plane to the rear of a plane passing through said grooves whereby the front face of the molding comprises four angular, equal surfaces, a flat rear surface and a rearwardly extending flange at one edge terminating in the rear of said flat rear surface.

6. A price tag molding adapted to be attached to the edge of a shelf and having longitudinal grooves near opposite edges of its front face for receiving the upper and lower edges of a price tag, the front surface of the molding being rearwardly inclined from each groove toward the center for substantially one-fourth of the width of the molding and then outwardly inclined to the center of the molding, said last named point being located in a plane to the rear of a plane passing through said grooves, whereby the front face of the molding comprises four angular, equal surfaces, a flat rear surface intermediate the upper and lower edges of the molding adapted to contact the front edge of the shelf, the rear surface of the molding being cut away above and below said flat rear surface, a rearwardly extending flange at each edge of the molding overhanging said cut away portion, one of said flanges extending rearwardly beyond the plane of said flat rear surface and the other flange terminating at the plane of said flat rear surface whereby the molding may be attached to the front of a shelf with said one rearwardly extending flange engaging over the top of the shelf or may be inverted so that said other rearwardly extending flange is flush with the top of the shelf.

GLEN L. GRAFF.
JOSEPH J. ROBINSON, Jr.

REFERENCES CITED

The following references are of record in the file of this patent:

UNITED STATES PATENTS

| Number | Name | Date |
|---|---|---|
| 1,915,116 | Barrett | June 20, 1933 |
| 1,929,468 | Bales et al. | Oct. 10, 1933 |
| 1,933,974 | Grimshaw | Nov. 7, 1933 |
| 1,970,739 | Cordes | Aug. 21, 1934 |
| 2,190,958 | Vander Clute | Feb. 20, 1940 |
| 2,197,657 | Churchill | Apr. 16, 1940 |
| 2,353,469 | Hopp | July 11, 1944 |
| 2,362,273 | Hopp | Nov. 7, 1944 |